(12) United States Patent
Zhang et al.

(10) Patent No.: US 12,348,375 B2
(45) Date of Patent: Jul. 1, 2025

(54) NETWORK TOPOLOGY GENERATION METHOD AND RELATED APPARATUS

(71) Applicant: Huawei Technologies Co., Ltd., Shenzhen (CN)

(72) Inventors: Junbo Zhang, Xi'an (CN); Weichao Yao, Xi'an (CN); Yantao Wang, Xi'an (CN); Yingying Feng, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 5 days.

(21) Appl. No.: 18/397,461

(22) Filed: Dec. 27, 2023

(65) Prior Publication Data

US 2024/0137279 A1 Apr. 25, 2024

Related U.S. Application Data

(63) Continuation of application No. PCT/CN2022/100479, filed on Jun. 22, 2022.

(30) Foreign Application Priority Data

Jun. 29, 2021 (CN) .......................... 202110727029.X

(51) Int. Cl.
*H04L 41/12* (2022.01)
(52) U.S. Cl.
CPC .................................. *H04L 41/12* (2013.01)

(58) Field of Classification Search
None
See application file for complete search history.

(56) References Cited

U.S. PATENT DOCUMENTS

| 2019/0349426 | A1* | 11/2019 | Smith | H04L 9/3239 |
| 2022/0335923 | A1* | 10/2022 | Yuan | G10K 11/17823 |
| 2023/0171163 | A1* | 6/2023 | Gudipati | H04L 41/0836 |

FOREIGN PATENT DOCUMENTS

| CN | 112242950 A | 1/2021 |
| EP | 2663050 A1 | 11/2013 |
| EP | 3062247 A1 | 8/2016 |

* cited by examiner

*Primary Examiner* — Quang N Nguyen
(74) *Attorney, Agent, or Firm* — Conley Rose, P.C.

(57) ABSTRACT

A network topology generation method includes: obtaining original coordinate information of each topology node in a first topology diagram, where the original coordinate information includes a first coordinate of each topology node in the first topology diagram, and topology nodes in the first topology diagram include a first node, a second node, and a third node; and generating a second topology diagram, where the second topology diagram corresponds to a topology diagram obtained by scaling the first topology diagram, a second coordinate of the second node is obtained using a second coordinate of the first node as a reference point, and a second coordinate of the third node is obtained using the second coordinate of the second node as a reference point.

19 Claims, 9 Drawing Sheets

NETWORK TOPOLOGY GENERATION METHOD AND RELATED APPARATUS

CROSS-REFERENCE TO RELATED APPLICATIONS

This is a continuation of International Patent Application No. PCT/CN2022/100479 filed on Jun. 22, 2022, which claims priority to Chinese Patent Application No. 202110727029. X filed on Jun. 29, 2021. The disclosures of the aforementioned applications are hereby incorporated by reference in their entireties.

TECHNICAL FIELD

This disclosure relates to the communication field, and in particular, to a network topology generation method and a related apparatus.

BACKGROUND

With continuous development of networks, network visualization has become an inevitable evolution direction. A network topology presents a logical structure and a physical structure of a network, so that a connection relationship between topology nodes is displayed more intuitively, thereby greatly improving operations and maintenance efficiency. A user lays out a network logical topology based on an understanding on a current network structure. Related operations and maintenance personnel use the network logical topology as a main reference.

Due to a large network scale, the operations and maintenance personnel need to operate and maintain the network topology based on scenario construction. Otherwise, the operations and maintenance personnel cannot effectively capture key information due to excessive network structure information. A process in which the operations and maintenance personnel capture key information of a network structure is generally as follows. After a node fault occurs in the network, nodes affected by the fault and a relationship between the nodes are obtained based on fault impact analysis. Then, a sub-diagram is cut from a global network topology structure. Because the sub-diagram is a part of the global network topology structure, a layout of nodes in the sub-diagram is loose, which is unfavorable for one-screen display. Therefore, a new layout is required and an original network relative structure needs to be retained. Therefore, it is necessary to study a solution of efficiently generating a network logical topology diagram.

SUMMARY

Embodiments of this disclosure disclose a network topology generation method and a related apparatus, to efficiently generate a network logical topology diagram.

According to a first aspect, an embodiment of this disclosure provides a network topology generation method. The method includes obtaining original coordinate information of each topology node in a first topology diagram, where the original coordinate information includes a first coordinate of each topology node in the first topology diagram, and topology nodes in the first topology diagram include a first node, a second node, and a third node, and generating a second topology diagram based on the original coordinate information, where the second topology diagram corresponds to a topology diagram obtained by scaling the first topology diagram, a second coordinate of the second node in the second topology diagram is obtained by using a second coordinate of the first node in the second topology diagram as a reference point, and a second coordinate of the third node in the second topology diagram is obtained by using the second coordinate of the second node in the second topology diagram as a reference point. The first node and the second node are different nodes. Each topology node in the first topology diagram may be some topology nodes in the first topology diagram, or may be all topology nodes in the first topology diagram. For example, each topology node in the first topology diagram is a fault-related topology node in the first topology diagram. The second topology diagram may be considered as a topology diagram that is more compact than the first topology diagram in terms of a layout and that is obtained by scaling in the first topology diagram. The second topology diagram may alternatively be considered as a topology diagram that is more compact than a sub-diagram (for example, including only a fault-related node) in the first topology diagram in terms of a layout and that is obtained by scaling in the sub-diagram.

The second node may be considered as a child node of the first node, and the third node may be considered as a child node of the second node. The network topology generation method provided in embodiments of this disclosure may be understood as that a child node moves in sequence relative to a parent node, so that a one-time layout effect can be ensured, layout efficiency can be improved, and layout micro-adjustment caused by node overlapping can be avoided.

In this embodiment of this disclosure, the second coordinate of the second node in the second topology diagram is obtained by using the second coordinate of the first node in the second topology diagram as the reference point, the second coordinate of the third node in the second topology diagram is obtained by using the second coordinate of the second node in the second topology diagram as the reference point. A network logical topology diagram can be efficiently generated, and layout micro-adjustment caused by node overlapping in the second topology diagram can be avoided.

In a possible implementation, the original coordinate information further indicates a connection relationship between the first node and the second node, and a connection relationship between the second node and the third node. It should be understood that the original coordinate information further indicates a connection relationship between topology nodes in the first topology diagram. For example, the original coordinate information further indicates a connection relationship between fault-related topology nodes in the first topology diagram.

In this implementation, obtaining the original coordinate information is obtaining the first coordinate of each topology node in the first topology diagram and the connection relationship between the topology nodes. The second topology diagram is generated based on the original coordinate information. It can be ensured that a connection relationship between topology nodes in the second topology diagram is the same as the connection relationship between the topology nodes in the first topology diagram.

In a possible implementation, an angle between a first connection line and a second connection line in the first topology diagram is equal to an angle between a third connection line and a fourth connection line in the second topology diagram, the first connection line is a connection line between the first node and the second node in the first topology diagram, the second connection line is a connection line between the second node and the third node in the first topology diagram, the third connection line is a connection line between the first node and the second node in the second topology diagram, and the fourth connection line is a connection line between the second node and the third node in the second topology diagram. An angle between any two connection lines in the second topology diagram is equal to an angle between two connection lines corresponding to the any two connection lines in the first topology diagram. In this implementation, the first connection line is a connection line corresponding to the third connection line in the first topology diagram, and the second connection line is a connection line corresponding to the fourth connection line in the first topology diagram.

In this implementation, the angle between the third connection line and the fourth connection line in the second topology diagram is equal to the angle between the first connection line and the second connection line in the first topology diagram, so that the second topology diagram is relatively consistent with the first topology diagram.

In a possible implementation, a ratio of a length of the third connection line to a length of the first connection line is not equal to a ratio of a length of the fourth connection line to a length of the second connection line.

In this implementation, the ratio of the length of the third connection line to the length of the first connection line is not equal to the ratio of the length of the fourth connection line to the length of the second connection line. This can avoid a problem of node overlapping or a non-compact layout that may occur when the ratio of the length of the third connection line to the length of the first connection line is equal to the ratio of the length of the fourth connection line to the length of the second connection line.

In a possible implementation, a distance between any two nodes in the second topology diagram is greater than or equal to a preset distance.

In this implementation, the distance between any two nodes in the second topology diagram is greater than or equal to the preset distance. This can avoid a problem of overlapping or partial overlapping of any two nodes in the second topology diagram.

In a possible implementation, that a second coordinate of the second node in the second topology diagram is obtained by using a second coordinate of the first node in the second topology diagram as a reference point includes that the second coordinate of the second node in the second topology diagram is obtained by using a first coordinate of the first node, the second coordinate of the first node in the second topology diagram, and a first coordinate of the second node.

In this implementation, the second coordinate of the second node in the second topology diagram is obtained by using the first coordinate of the first node, the second coordinate of the first node in the second topology diagram, and the first coordinate of the second node. It can be ensured that a location relationship between the second node and the first node in the second topology diagram is basically unchanged from a location relationship between the second node and the first node in the first topology diagram.

In a possible implementation, the second coordinate of the second node in the second topology diagram is obtained by using a first movement increment and the second coordinate of the first node in the second topology diagram, and the first movement increment is obtained by using the first coordinate of the first node and the first coordinate of the second node. The first movement increment may represent a location relationship between the first coordinate of the first node and the first coordinate of the second node. Alternatively, the first movement increment may represent a location relationship between the second coordinate of the second node in the second topology diagram and the second coordinate of the first node in the second topology diagram.

In this implementation, the second coordinate of the second node in the second topology diagram is obtained by using the first movement increment and the second coordinate of the first node in the second topology diagram. It can be ensured that a location relationship between the second node and the first node in the second topology diagram is basically unchanged from a location relationship between the second node and the first node in the first topology diagram.

In a possible implementation, generating a second topology diagram based on the original coordinate information includes determining the second coordinate of the second node in the second topology diagram based on the first coordinate of the first node, the second coordinate of the first node in the second topology diagram, and the first coordinate of the second node.

In this implementation, it can be ensured that the location relationship between the second node and the first node in the second topology diagram is basically unchanged from the location relationship between the second node and the first node in the first topology diagram.

In a possible implementation, the second coordinate of the second node in the second topology diagram, the first coordinate of the first node, the second coordinate of the first node in the second topology diagram, and the first coordinate of the second node meet the following formula:

$$x2\_new = x1\_new + (x2\_old - x1\_old)*s; \text{ and}$$

$$y2\_new = y1\_new + (y2\_old - y1\_old)*s.$$

$x2\_new$ represents a horizontal coordinate of the second coordinate of the second node in the second topology diagram, $y2\_new$ represents a vertical coordinate of the second coordinate of the second node in the second topology diagram, $x1\_new$ represents a horizontal coordinate of the second coordinate of the first node in the second topology diagram, $y1\_new$ represents a vertical coordinate of the second coordinate of the first node in the second topology diagram, $x2\_old$ represents a horizontal coordinate of the first coordinate of the second node, $y2\_old$ represents a vertical coordinate of the first coordinate of the first node, $x1\_old$ represents a horizontal coordinate of the first coordinate of the first node, $y1\_old$ represents a vertical coordinate of the first coordinate of the first node, and $s$ represents a scaling factor. $s$ is a real number. $s$ may be a preconfigured value. Alternatively, $s$ may be obtained based on a first distance between the first node and the second node in the first topology diagram.

In this implementation, the location relationship between the second node and the first node in the second topology diagram is basically consistent with the location relationship between the second node and the first node in the first topology diagram.

In a possible implementation, generating a second topology diagram based on the original coordinate information includes determining the first movement increment based on the first coordinate of the first node and the first coordinate of the second node, and determining the second coordinate of the second node in the second topology diagram based on the first movement increment and the second coordinate of the first node in the second topology diagram.

In this implementation, it can be ensured that the location relationship between the second node and the first node in the second topology diagram is basically unchanged from the location relationship between the second node and the first node in the first topology diagram.

In a possible implementation, determining the first movement increment based on the first coordinate of the first node and the first coordinate of the second node includes obtaining a first coordinate difference, where the first coordinate difference is a difference between the first coordinate of the second node and the first coordinate of the first node, and determining the first movement increment based on the first coordinate difference and a non-linear positive correlation factor. When the first distance between the first node and the second node in the first topology diagram is greater than a preset spacing, the non-linear positive correlation factor is obtained by using m powers of a ratio of the preset spacing to the first distance, where m is a real number greater than 0 and less than 1, or when the first distance is less than or equal to the preset spacing, the non-linear positive correlation factor is obtained by using a ratio of the preset spacing to the first distance. For example, the first movement increment is equal to a product of the first coordinate difference and the non-linear positive correlation factor.

In a possible implementation, the first movement increment is positively correlated with the first coordinate difference, and the first coordinate difference is a difference between the first coordinate of the second node and the first coordinate of the first node or a difference between the first coordinate of the first node and the first coordinate of the second node.

In this implementation, the first movement increment is positively correlated with the first coordinate difference, so that the location relationship between the second node and the first node in the second topology diagram is basically unchanged from the location relationship between the second node and the first node in the first topology diagram.

In a possible implementation, the first movement increment is obtained by using the first coordinate difference and the non-linear positive correlation factor. When the first distance between the first node and the second node in the first topology diagram is greater than the preset spacing, the non-linear positive correlation factor is obtained by using m powers of the ratio of the preset spacing to the first distance, where m is the real number greater than 0 and less than 1. Alternatively, when the first distance is less than or equal to the preset spacing, the non-linear positive correlation factor is obtained by using the ratio of the preset spacing to the first distance.

In a possible implementation, the non-linear positive correlation factor meets the following formula:

$$r(l) = \begin{cases} \left(\frac{l_{min}}{l}\right)^m, & l > l_{min} \\ \left(\frac{l_{min}}{l}\right), & l \le l_{min} \end{cases}.$$

r(l) represents the non-linear positive correlation factor, $l_{min}$ represents the preset spacing, l represents the first distance, and m is a constant. m is a constant such as 0.5, 0.6, 0.65, or 0.7 that can be configured based on an actual requirement. The preset spacing can be configured based on the actual requirement. For example, the preset spacing is four times a size of a node. For a node represented by a circle, a size of the node is a diameter of the circle corresponding to the node. For a node represented by a square, a size of the node is a length of the square (or a length of a diagonal of the square) corresponding to the node.

In this implementation, the first movement increment is obtained by using the non-linear positive correlation factor and the first coordinate difference, so that a long connection can be converged, thereby ensuring a compact layout of the second topology diagram.

In a possible implementation, the first movement increment is obtained by using the first coordinate difference and a linear positive correlation factor.

In this implementation, the first movement increment is obtained by using the first coordinate difference and the linear positive correlation factor, so that a structure of the second topology diagram is completely the same as a structure of the first topology diagram.

In a possible implementation, before obtaining original coordinate information of each topology node in a first topology diagram, the method further includes receiving alarm information uploaded by a node in a target network, where the target network includes the first node, the second node, and the third node, and determining a plurality of fault-related nodes in the target network based on the alarm information and topology diagram metadata, where the topology diagram metadata is for determining a topology relationship between nodes in the target network. Obtaining original coordinate information of each topology node in a first topology diagram includes obtaining original coordinate information corresponding to the plurality of nodes in the first topology diagram.

In this implementation, the plurality of fault-related nodes in the target network is determined based on the alarm information and the topology diagram metadata, the original coordinate information corresponding to the plurality of nodes in the first topology diagram is obtained, so that the original coordinate information corresponding to the plurality of fault-related nodes in the target network can be accurately obtained.

In a possible implementation, after generating a second topology diagram based on the original coordinate information, the method further includes displaying the second topology diagram or sending the second topology diagram.

In this implementation, displaying the second topology diagram or sending the second topology diagram may intuitively display the second topology diagram or send the second topology diagram to a corresponding device.

According to a second aspect, this disclosure provides a network topology generation apparatus. The network topology generation apparatus includes an obtaining unit configured to obtain original coordinate information of each topology node in a first topology diagram, where the original coordinate information includes a first coordinate of each topology node in the first topology diagram, and topology nodes in the first topology diagram include a first node, a second node, and a third node, and a generation unit configured to generate a second topology diagram based on the original coordinate information, where the second topology diagram corresponds to a topology diagram obtained by scaling the first topology diagram, a second coordinate of the second node in the second topology diagram is obtained by using a second coordinate of the first node in the second topology diagram as a reference point, and a second coordinate of the third node in the second topology diagram is obtained by using the second coordinate of the second node in the second topology diagram as a reference point.

In a possible implementation, the original coordinate information further indicates a connection relationship between a plurality of nodes, the first node and the second node have a connection relationship, and the second node and the third node have a connection relationship.

In a possible implementation, an angle between a first connection line and a second connection line in the first topology diagram is equal to an angle between a third connection line and a fourth connection line in the second topology diagram, the first connection line is a connection line between the first node and the second node in the first topology diagram, the second connection line is a connection line between the second node and the third node in the first topology diagram, the third connection line is a connection line between the first node and the second node in the second topology diagram, and the fourth connection line is a connection line between the second node and the third node in the second topology diagram.

In a possible implementation, a ratio of a length of the third connection line to a length of the first connection line is not equal to a ratio of a length of the fourth connection line to a length of the second connection line.

In a possible implementation, a distance between any two nodes in the second topology diagram is greater than or equal to a preset distance.

In a possible implementation, that a second coordinate of the second node in the second topology diagram is obtained by using a second coordinate of the first node in the second topology diagram as a reference point includes that the second coordinate of the second node in the second topology diagram is obtained by using a first coordinate of the first node, the second coordinate of the first node in the second topology diagram, and a first coordinate of the second node.

In a possible implementation, the second coordinate of the second node in the second topology diagram is obtained by using a first movement increment and the second coordinate of the first node in the second topology diagram, and the first movement increment is obtained by using the first coordinate of the first node and the first coordinate of the second node.

In a possible implementation, the first movement increment is positively correlated with a first coordinate difference, and the first coordinate difference is a difference between the first coordinate of the second node and the first coordinate of the first node or a difference between the first coordinate of the first node and the first coordinate of the second node.

In a possible implementation, the generation unit is further configured to determine the second coordinate of the second node in the second topology diagram based on the first coordinate of the first node, the second coordinate of the first node in the second topology diagram, and the first coordinate of the second node.

In a possible implementation, the generation unit is further configured to calculate the second coordinate of the second node in the second topology diagram by using the following formula:

x2_new=x1_new+(x2_old−x1_old)*s; and y2_new=y1_new+(y2_old−y1_old)*s.

x2_new represents a horizontal coordinate of the second coordinate of the second node in the second topology diagram, y2_new represents a vertical coordinate of the second coordinate of the second node in the second topology diagram, x1_new represents a horizontal coordinate of the second coordinate of the first node in the second topology diagram, y1_new represents a vertical coordinate of the second coordinate of the first node in the second topology diagram, x2_old represents a horizontal coordinate of the first coordinate of the second node, y2_old represents a vertical coordinate of the first coordinate of the first node, x1_old represents a horizontal coordinate of the first coordinate of the first node, y1_old represents a vertical coordinate of the first coordinate of the first node, and s represents a scaling factor. s is a real number. s may be a preconfigured value. Alternatively, s may be obtained based on a first distance between the first node and the second node in the first topology diagram.

In a possible implementation, the generation unit is further configured to determine the first movement increment based on the first coordinate of the first node and the first coordinate of the second node, and determine the second coordinate of the second node in the second topology diagram based on the first movement increment and the second coordinate of the first node in the second topology diagram.

In a possible implementation, the generation unit is further configured to obtain a first coordinate difference, where the first coordinate difference is a difference between the first coordinate of the second node and the first coordinate of the first node or a difference between the first coordinate of the first node and the first coordinate of the second node, and determine the first movement increment based on the first coordinate difference and a non-linear positive correlation factor. When the first distance between the first node and the second node in the first topology diagram is greater than a preset spacing, the non-linear positive correlation factor is obtained by using m powers of a ratio of the preset spacing to the first distance, where m is a real number greater than 0 and less than 1, or when the first distance is less than or equal to the preset spacing, the non-linear positive correlation factor is obtained by using a ratio of the preset spacing to the first distance.

In a possible implementation, the first movement increment is obtained by using the first coordinate difference and the non-linear positive correlation factor. When the first distance between the first node and the second node in the first topology diagram is greater than the preset spacing, the non-linear positive correlation factor is obtained by using m powers of the ratio of the preset spacing to the first distance, where m is the real number greater than 0 and less than 1. Alternatively, when the first distance is less than or equal to the preset spacing, the non-linear positive correlation factor is obtained by using the ratio of the preset spacing to the first distance.

In a possible implementation, the generation unit is further configured to calculate the non-linear positive correlation factor by using the following formula:

$$r(l) = \begin{cases} \left(\frac{l_{min}}{l}\right)^m, & l > l_{min} \\ \left(\frac{l_{min}}{l}\right), & l \leq l_{min} \end{cases},$$

r(l) represents the non-linear positive correlation factor, $l_{min}$ represents the preset spacing, l represents the first distance, and m is a constant. m is a constant such as 0.5, 0.6, 0.65, or 0.7 that can be configured based on an actual requirement. The preset spacing can be configured based on the actual requirement. For example, the preset spacing is four times a size of a node. For a node represented by a circle, a size of the node is a diameter of the circle corresponding to the node. For a node represented by a square, a size of the node is a length of the square (or a length of a diagonal of the square) corresponding to the node.

In a possible implementation, the network topology generation apparatus further includes a receiving unit configured to receive alarm information uploaded by a node in a target network, where a plurality of nodes in the target network correspond to topology nodes in the first topology diagram, and a fault determining unit configured to determine a plurality of fault-related nodes in the target network based on the alarm information and topology diagram metadata, where the topology diagram metadata is for determining a topology relationship between nodes in the target network. The obtaining unit is further configured to obtain topology node information and original coordinate information corresponding to the plurality of nodes.

In a possible implementation, the output unit is further configured to display the second topology diagram or send the second topology diagram.

For technical effects brought by the second aspect or the possible implementations, refer to the descriptions of the technical effects of the first aspect or the corresponding implementations.

According to a third aspect, an embodiment of this disclosure provides a network topology generation apparatus. The network topology generation apparatus includes one or more processors and a memory. The memory is coupled to the one or more processors, the memory is configured to store a computer program code, the computer program code includes computer instructions, and the one or more processors are configured to invoke the computer instructions, to enable the network topology generation apparatus to perform the steps of obtaining original coordinate information of each topology node in a first topology diagram, where the original coordinate information includes a first coordinate of each topology node in the first topology diagram, and topology nodes in the first topology diagram include a first node, a second node, and a third node, and generating a second topology diagram based on the original coordinate information, where the second topology diagram corresponds to a topology diagram obtained by scaling the first topology diagram, a second coordinate of the second node in the second topology diagram is obtained by using a second coordinate of the first node in the second topology diagram as a reference point, and a second coordinate of the third node in the second topology diagram is obtained by using the second coordinate of the second node in the second topology diagram as a reference point.

With reference to the third aspect, in some embodiments, the network topology generation apparatus includes a communication interface configured to receive alarm information uploaded by a node in a target network, where the target network includes the first node, the second node, and the third node. The one or more processors are further configured to invoke the computer instructions, to enable the terminal device to perform the steps of determining a plurality of fault-related nodes in the target network based on the alarm information and topology diagram metadata, where the topology diagram metadata is for determining a topology relationship between nodes in the target network, and obtaining original coordinate information corresponding to the plurality of nodes in the first topology diagram.

With reference to the third aspect, in some embodiments, the network topology generation apparatus includes an output device configured to display the second topology diagram or send the second topology diagram.

With reference to the third aspect, in some embodiments, the one or more processors are further configured to invoke the computer instructions, to enable the network topology generation apparatus to perform the step of determining the second coordinate of the second node in the second topology diagram based on the first coordinate of the first node, the second coordinate of the first node in the second topology diagram, and the first coordinate of the second node.

With reference to the third aspect, in some embodiments, the one or more processors are further configured to invoke the computer instructions, to enable the network topology generation apparatus to perform the steps of determining the first movement increment based on the first coordinate of the first node and the first coordinate of the second node, and determining the second coordinate of the second node in the second topology diagram based on the first movement increment and the second coordinate of the first node in the second topology diagram.

With reference to the third aspect, in some embodiments, the one or more processors are further configured to invoke the computer instructions, to enable the network topology generation apparatus to perform the steps of obtaining a first coordinate difference, where the first coordinate difference is a difference between the first coordinate of the second node and the first coordinate of the first node or a difference between the first coordinate of the first node and the first coordinate of the second node, and determining the first movement increment based on the first coordinate difference and a non-linear positive correlation factor. When a first distance between the first node and the second node in the first topology diagram is greater than a preset spacing, the non-linear positive correlation factor is obtained by using m powers of a ratio of the preset spacing to the first distance, where m is a real number greater than 0 and less than 1, or when the first distance is less than or equal to the preset spacing, the non-linear positive correlation factor is obtained by using a ratio of the preset spacing to the first distance.

According to a fourth aspect, an embodiment of this disclosure provides a chip. The chip is used in a terminal device. The chip includes one or more processors. The processor is configured to invoke a computer instruction, to enable the terminal device to perform the method described in any one of the first aspect or the possible implementations of the first aspect.

According to a fifth aspect, an embodiment of this disclosure provides a computer program product including instructions. When the computer program product runs on a terminal device, the terminal device is enabled to perform the method described in any one of the first aspect and the possible implementations of the first aspect.

According to a sixth aspect, an embodiment of this disclosure provides a computer-readable storage medium, including instructions. When the instructions are run on a terminal device, the terminal device is enabled to perform the method described in any one of the first aspect and the possible implementations of the first aspect.

It may be understood that the terminal device provided in the third aspect, the chip provided in the fourth aspect, the computer program product provided in the fifth aspect, and the computer storage medium provided in the sixth aspect each are configured to perform the method provided in embodiments of this disclosure. Therefore, for beneficial effects that can be achieved by the method, refer to beneficial effects in the corresponding method. Details are not described herein again.

BRIEF DESCRIPTION OF DRAWINGS

To describe the technical solutions in some embodiments of this disclosure more clearly, the following describes the accompanying drawings for describing embodiments of this disclosure.

DESCRIPTION OF EMBODIMENTS

In the specification, claims, and the accompanying drawings of this disclosure, terms such as "first" and "second" are only intended to distinguish between different objects but do not describe a particular order. In addition, terms "include", "have", or any other variant thereof are intended to cover a non-exclusive inclusion. For example, a process, a method, a system, a product, or a device that includes a series of steps or units is not limited to the listed steps or units, but optionally further includes an unlisted step or unit, or optionally further includes another step or unit inherent to the process, the method, the product, or the device.

Terms used in the following embodiments of this disclosure are merely intended to describe specific embodiments, but are not intended to limit this disclosure. As used in the specification of this disclosure and the appended claims, the singular expression "a", "an", "the", "the foregoing", "such a", or "this" is intended to also include a plural expression unless otherwise clearly indicated in the context. It should also be understood that the term "and/or" used in this disclosure means and includes any or all possible combinations of one or more associated listed items. For example, "A and/or B" may represent the following three cases: only A exists, only B exists, and both A and B exist, where A and B may be singular or plural. The term "a plurality of" used in this disclosure means two or more. The terms "node" and "network element" used in this disclosure have a same concept.

Because a network scale in an actual application is usually large, operations and maintenance personnel usually need to obtain network topology diagrams of only some nodes in the entire network. For example, after a fault occurs on one or more nodes in a network, to avoid that the operations and maintenance personnel cannot effectively capture key information due to excessive network structure information, the operations and maintenance personnel only need to obtain network topology diagrams corresponding to these nodes that are affected by faults and that are in the entire network. For another example, the operations and maintenance personnel only need to obtain a network topology diagram corresponding to each node related to a node in the entire network. In other words, the operations and maintenance personnel sometimes only need to obtain a sub-diagram (for example, corresponding to each node affected by a fault) of a global network topology diagram (corresponding to the entire network). A manner of obtaining a sub-diagram corresponding to some nodes in the entire network is to directly cut the sub-diagram from the global network topology diagram. A layout of nodes in the sub-diagram is loose and is unfavorable for one-screen display. Therefore, the sub-diagram needs to be re-laid out. A target of re-laying out the sub-diagram is to make the layout of nodes in the sub-diagram compact and facilitate one-screen display.

Figure 1:
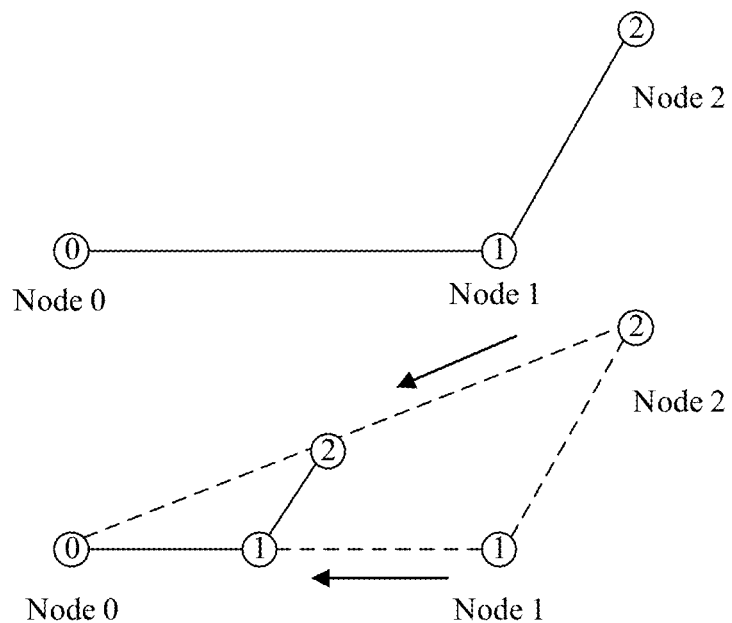
FIG. 1 is a schematic diagram of a solution of proportionally scaling a sub-diagram according to an embodiment of this disclosure.

To resolve a problem that the sub-diagram directly cut from the global network topology diagram is unfavorable for one-screen display, a network topology generation solution (a solution of proportionally scaling a sub-diagram) is as follows. A central point selected in the sub-diagram is used as a reference anchor node (or a reference node or a reference anchor), and other nodes are scaled in, in a proportional manner based on the reference node. FIG. 1 is a schematic diagram of a solution of proportionally scaling a sub-diagram according to an embodiment of this disclosure. As shown in FIG. 1, a node 0 is selected as a reference anchor (or an anchor node), and dashed and straight lines for movement are drawn for other nodes by using the node 0 as a reference, and are linearly scaled in on the movement reference line based on a proportion.

The solution of proportionally scaling a sub-diagram shown in FIG. 1 may cause the following problems:

1. Node Overlapping:

When a network topology diagram is generated by using the solution of proportionally scaling a sub-diagram (in other words, a sub-diagram is re-laid out), a fixed reference anchor is selected for scale-in, and all nodes move relative to the node. This manner causes node overlapping.

Figure 2:
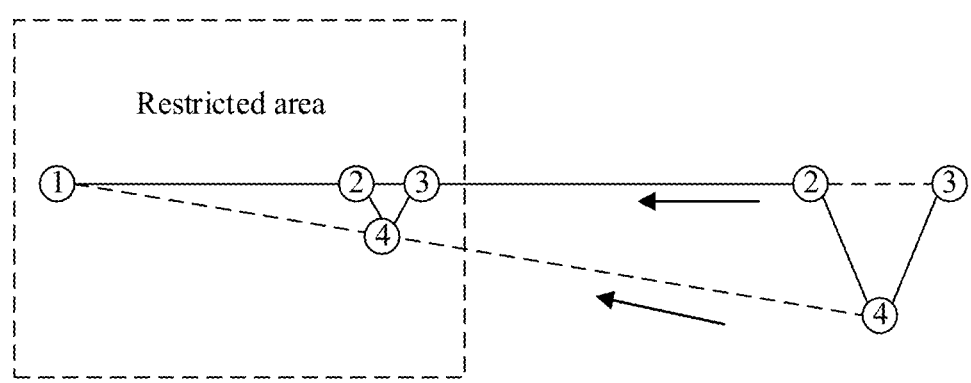
FIG. 2 is an example of a network topology diagram according to an embodiment of this disclosure.

FIG. 2 is an example of a network topology diagram according to an embodiment of this disclosure. As shown in FIG. 2, a restricted area (a rectangular area surrounded by a dashed-line box) is an area in which operations and maintenance personnel expect each node to be located. An arrow direction indicates a moving direction of a node 2, a node 3, and a node 4. The node 2, the node 3, and the node 4 are all scaled in based on a same proportion relative to a reference anchor 1. In this way, node overlapping occurs. In this case, to solve an overlap problem, secondary layout adjustment is required. Once the adjustment is performed, a distance between other nodes is affected, resulting in associated adjustment. Consequently, layout performance deteriorates and processing duration increases.

Figure 3:
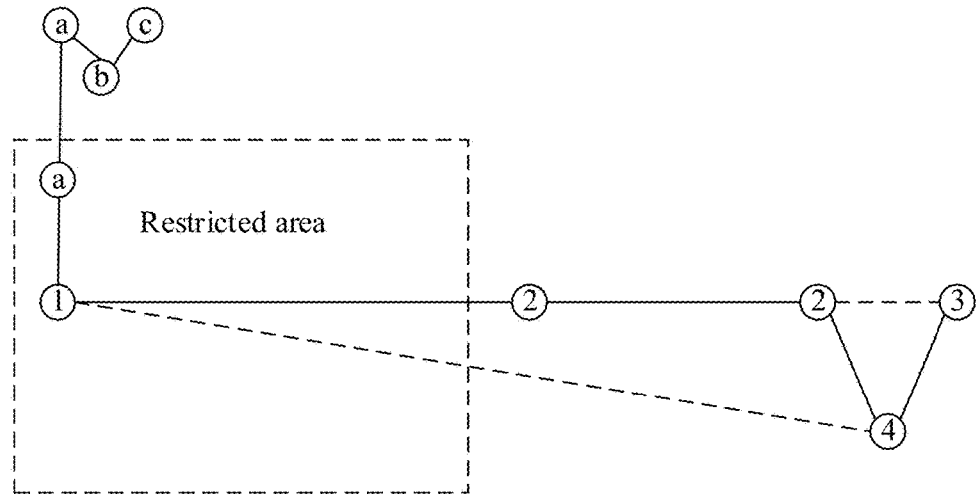
FIG. 3 is an example of another network topology diagram according to an embodiment of this disclosure.

2. Non-Compact Layout:

The solution of proportionally scaling a sub-diagram is to linearly and proportionally scale in a length of a connection line between each node and a reference node. When a longer connection and a shorter connection in a topology sub-diagram are scaled in based on a same proportion, nodes closer to the reference node are scaled in compactly, and nodes farther away from the reference node are scaled in loosely. FIG. 3 is an example of another network topology diagram according to an embodiment of this disclosure. As shown in FIG. 3, a restricted area (a rectangular area surrounded by a dashed-line box) is an area in which operations and maintenance personnel expect each node to be located. A node a closer to a reference node 1 is in the display area after linear shrinkage. A node 2 closer to the reference node 1 is still outside the display area after linear shrinkage. If a proportional scaling factor is set excessively large, this may result in node overlapping (as shown in FIG. 2).

This disclosure provides a new network topology generation method, to resolve problems of node overlapping and a non-compact layout caused by the solution of proportionally scaling a sub-diagram. In the network topology generation method provided in this disclosure, child node traversal and parent-child node iterative layout is used. A new coordinate (corresponding to a second coordinate) of a child node is obtained based on a parallelogram rule. It can be ensured that a location relationship of nodes in a generated network topology diagram (corresponding to a sub-diagram) is basically the same as a location relationship of nodes in a global network topology diagram. Further, in the network topology generation method provided in this disclosure, a shrinkage amplitude of the new coordinate of the child node is calculated based on a non-linear limiting distance shrinkage function, so that node overlapping in a generated network topology and a non-compact layout of the network topology diagram can be avoided.

The following first describes, with reference to the accompanying drawings, an example of an application scenario to which the network topology generation method provided in this disclosure is applicable.

Figure 4:
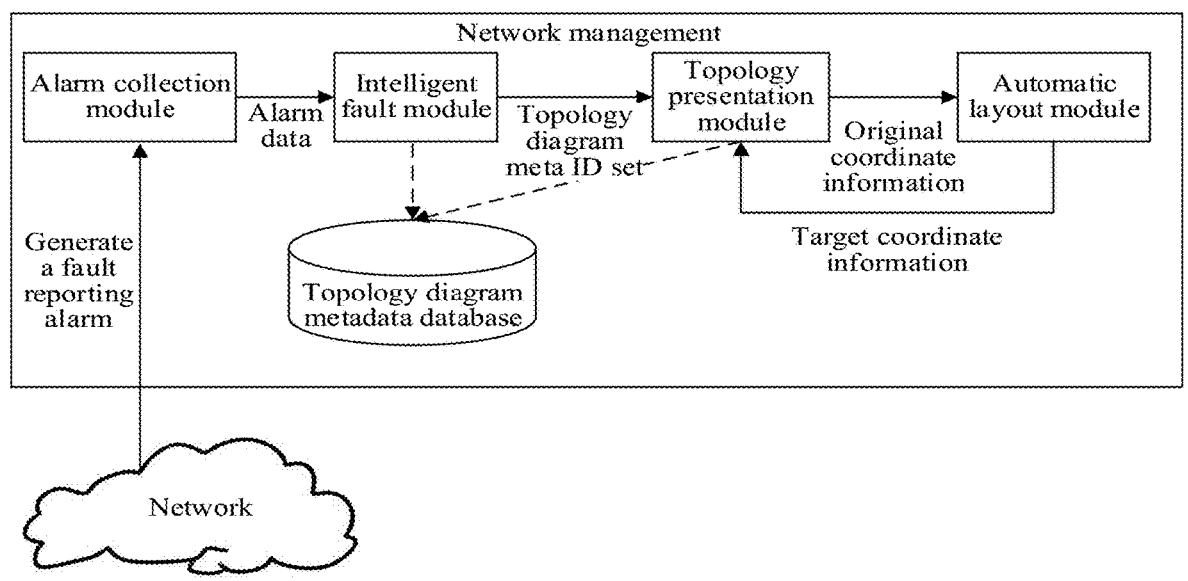
FIG. 4 is an example of a schematic diagram of a network topology diagram generation process according to an embodiment of this disclosure.

FIG. 4 is an example of a schematic diagram of a network topology diagram generation process according to an embodiment of this disclosure. For functions or descriptions of components (or modules) in FIG. 4, refer to Table 1. In FIG. 4, a solid arrow represents a data flow, and a dashed arrow represents a control signal flow (or a message flow). As shown in FIG. 4, alarm data reported by a network element in a domain in an actual network environment is reported to a network management system for collection. In other words, an alarm collection module in the network management system (namely, a network topology generation apparatus, for example, a server or a computer) summarizes the alarm data. Then, the network management system invokes an intelligent fault module to perform correlation analysis on the alarm data and clusters the alarm data into faults, and calculates a fault propagation diagram, namely, fault node information (or a topology diagram meta identity document (ID) set), based on an ID of a network element reported by the alarm collection module and with reference to topology diagram metadata. The topology diagram metadata may be a global network topology diagram or other data for determining a connection relationship between network elements in a network. The fault node information indicates a connection between each fault-related node calculated by the intelligent fault module and each node. The topology diagram meta ID set is stored in the intelligent fault module, and the intelligent fault module reports the topology diagram meta ID set to a topology presentation module. The topology presentation module queries, based on an ID of each fault-related node, topology presentation information (namely, original coordinate information) such as an original coordinate (corresponding to a first coordinate) and an icon corresponding to each node in a topology diagram metadata database. Then, the topology presentation module transfers the original coordinate information (including the original coordinate of each fault-related node) to an automatic layout module. The automatic layout module performs, based on the original coordinate information, the network topology generation method provided in this disclosure, to obtain target coordinate information (including a new coordinate of each fault-related node). The automatic layout module sends the target coordinate information to the topology presentation module. The topology presentation module generates a network topology diagram based on the target coordinate information and displays the network topology diagram. In other words, after obtaining coordinate information of each fault-related node in the global network topology diagram (corresponding to a first topology diagram), the automatic layout module performs the network topology generation method provided in this disclosure, to obtain the new coordinate of each fault-related node, and then displays a generated network topology diagram (corresponding to a second topology diagram) by using the topology presentation module.

TABLE 1

| Component | Description |
| --- | --- |
| Network | Refers to a network environment (including physical links and network devices at different levels) deployed by an actual carrier or enterprise. If a fault occurs, a related device (namely, a network element) in the network environment report an alarm to the network management system. |
| Network management system | Collection of network management functions, including an alarm collection module, an intelligent fault module, a topology presentation module, and an automatic layout module. |
| Alarm collection module | Responsible for collecting alarms of network devices and reporting the alarms to the intelligent fault module. |
| Intelligent fault module | Mainly responsible for aggregating alarms and aggregating related alarms into one or more faults. |

TABLE 1-continued

| Component | Description |
| --- | --- |
| Topology diagram metadata database | Responsible for storing network topology data structure, including data related to a network topology structure, such as nodes (network elements), connections (connection relationship between network elements), and coordinates. The topology diagram metadata database mainly stores a global topology structure of network devices managed by the network management system. |
| Automatic layout module | Responsible for generating a network topology diagram. |
| Topology presentation module | Intuitively displays the network topology structure by point or line based on a visual technology. |

It should be understood that FIG. 4 is only an example of a network topology diagram generation process according to this disclosure. A network system may alternatively generate the network topology diagram in another manner. For example, the intelligent fault module may report the fault node information to the automatic layout module, and the automatic layout module queries, based on an ID of each fault-related node, an original coordinate corresponding to the node in the topology diagram metadata database. Division of modules in the network management system (namely, the network topology generation apparatus) is merely logical function division. In actual implementation, all or some of the modules may be integrated into a physical entity, or may be physically separated. For example, the foregoing modules may be a separately disposed processing element, or may be integrated into a chip of the network topology generation apparatus for implementation. In addition, the modules may alternatively be stored in a storage element of a controller in a form of program code, and are invoked by a processing element of a processor to perform functions of the foregoing modules. In addition, the modules may be integrated together or may be independently implemented. The processing element may be an integrated circuit chip, and has a signal processing capability. In an implementation process, steps in the foregoing method or the foregoing modules may be implemented by using an integrated logic circuit of hardware in the processing element or instructions in a form of software. In actual application, the network topology generation apparatus may further include more or fewer function modules. This is not limited herein.

The following describes a network topology generation solution provided in this disclosure with reference to the accompanying drawings.

Figure 5:
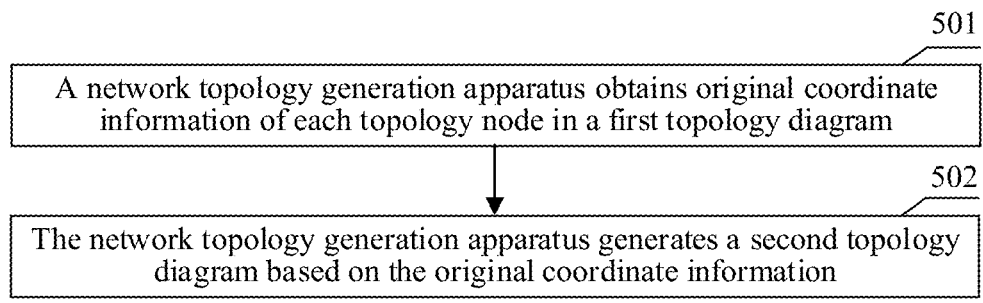
FIG. 5 is a flowchart of a network topology generation method according to an embodiment of this disclosure.

FIG. 5 is a flowchart of a network topology generation method according to an embodiment of this disclosure. As shown in FIG. 5, the method includes the following steps.

Step 501: A network topology generation apparatus obtains original coordinate information of each topology node in a first topology diagram.

The original coordinate information includes a first coordinate of each topology node in the first topology diagram. Topology nodes in the first topology diagram include a first node, a second node, and a third node. The first node, the second node, and the third node may be different nodes in the first topology diagram. Each topology node in the first topology diagram may be some topology nodes in the first topology diagram, or may be all topology nodes in the first topology diagram.

A possible implementation of step 501 is as follows. The network topology generation apparatus obtains a coordinate of each fault-related topology node in the first topology diagram, to obtain the original coordinate information.

Another possible implementation of step 501 is as follows. The network topology generation apparatus obtains a coordinate of a target topology node (namely, each topology node) in the first topology diagram, to obtain the original coordinate information. The target topology node may be some nodes in the first topology diagram, for example, nodes on a data transmission link.

In a possible implementation, the original coordinate information further indicates a connection relationship between the first node and the second node, and a connection relationship between the second node and the third node. For example, the original coordinate information indicates a connection relationship between topology nodes in the first topology diagram.

Step 502: The network topology generation apparatus generates a second topology diagram based on the original coordinate information.

The second topology diagram corresponds to a topology diagram obtained by scaling the first topology diagram. A second coordinate of the second node in the second topology diagram is obtained by using a second coordinate of the first node in the second topology diagram as a reference point. A second coordinate of the third node in the second topology diagram is obtained by using the second coordinate of the second node in the second topology diagram as a reference point. The second topology diagram may be considered as a topology diagram that is more compact than the first topology diagram in terms of a layout and that is obtained by scaling in the first topology diagram. The second topology diagram may alternatively be considered as a topology diagram that is more compact than a sub-diagram (for example, including only a fault-related node) in the first topology diagram in terms of a layout and that is obtained by scaling in the sub-diagram.

The second node may be considered as a child node of the first node, and the third node may be considered as a child node of the second node. The network topology generation method provided in embodiments of this disclosure may be understood as that a child node moves in sequence relative to a parent node, so that a one-time layout effect can be ensured, layout efficiency can be improved, and layout micro-adjustment caused by node overlapping can be avoided.

A possible implementation of step 502 is as follows. The second coordinate of the second node in the second topology diagram is determined based on a first coordinate of the first node, the second coordinate of the first node in the second topology diagram, and a first coordinate of the second node. A manner of determining the second coordinate of the second node in the second topology diagram is described herein. It should be understood that the network topology generation apparatus may determine a second coordinate of any node in the second topology diagram in a similar or a same implementation. For example, the network topology generation apparatus determines the second coordinate of the third node in the second topology diagram based on the first coordinate of the second node, the second coordinate of the second node in the second topology diagram, and a first coordinate of the third node. In some embodiments, the network topology generation apparatus determines a second coordinate of each node in the second topology diagram based on the original coordinate information, and generates the second topology diagram based on the second coordinate of each node in the second topology diagram. An implementation in which the network topology generation apparatus determines the second coordinate of the second node in the second topology diagram based on the first coordinate of the first node, the second coordinate of the first node in the second topology diagram, and the first coordinate of the second node is described in detail below.

In this embodiment of this disclosure, the second coordinate of the second node in the second topology diagram is obtained by using the second coordinate of the first node in the second topology diagram as the reference point, the second coordinate of the third node in the second topology diagram is obtained by using the second coordinate of the second node in the second topology diagram as the reference point. A network logical topology diagram can be efficiently generated, and layout micro-adjustment caused by node overlapping in the second topology diagram can be avoided.

Figure 6:
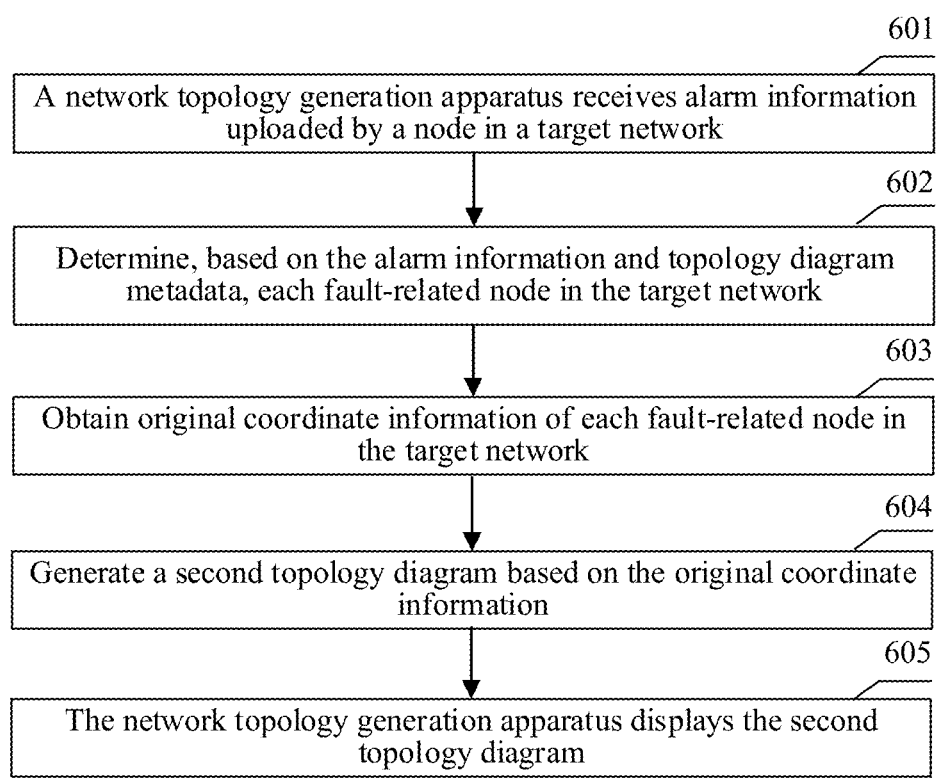
FIG. 6 is a flowchart of another network topology generation method according to an embodiment of this disclosure.

FIG. 6 is a flowchart of another network topology generation method according to an embodiment of this disclosure. A method procedure in FIG. 6 is a possible implementation of the method procedure in FIG. 5. As shown in FIG. 6, the method includes the following steps.

601: A network topology generation apparatus receives alarm information uploaded by a node in a target network.

The target network can be any network (corresponding to the entire network), for example, a local area network, a metropolitan area network, or a wide area network. The target network may alternatively be a local network specified by a user, for example, a local area network.

Step 601 may be replaced with the following. The network topology generation apparatus collects alarm information of each node in the target network by using an alarm collection module.

602: The network topology generation apparatus determines, based on alarm information and topology diagram metadata, each fault-related node in the target network.

The topology diagram metadata is for determining a topology relationship, namely, a connection relationship, between nodes in the target network. Each fault-related node in the target network includes a first node, a second node, and a third node. The network topology generation apparatus may obtain the topology diagram metadata from a topology diagram metadata database.

603: The network topology generation apparatus obtains original coordinate information of each fault-related node in the target network.

The foregoing original coordinate information includes a first coordinate of each fault-related node in a first topology diagram. For example, the original coordinate information includes a first coordinate of the first node, a first coordinate of the second node, and a first coordinate of the third node. The foregoing original coordinate information further indicates a connection relationship between fault-related nodes in the first topology diagram. For example, the original coordinate information includes a first coordinates of fault-related nodes, and a connection relationship between the fault-related nodes. The first topology diagram may be considered as a topology diagram of the target network. In other words, the first topology diagram may reflect a topology relationship between nodes in the target network.

604: The network topology generation apparatus generates a second topology diagram based on the original coordinate information of each fault-related node.

The second topology diagram may be considered as a topology diagram obtained by scaling a sub-diagram (namely, a topology diagram that represents a connection relationship between fault-related nodes) of the first topology diagram. To better understand a relationship between the second topology diagram and the first topology diagram, that the network topology generation apparatus generates a second topology diagram based on the original coordinate information of each fault-related node may be understood as performing scaling processing on the sub-diagram that is in the first topology diagram and that represents the connection relationship between the fault-related nodes, to obtain the second topology diagram. In other words, from an objective of generating the second topology diagram, generating the second topology diagram may be considered as generating the topology diagram obtained by scaling the sub-diagram of the first topology diagram, and does not really perform scaling processing on the sub-diagram of the first topology diagram.

A second coordinate of the second node in the second topology diagram is obtained by using a second coordinate of the first node in the second topology diagram as a reference point. A second coordinate of the third node in the second topology diagram is obtained by using the second coordinate of the second node in the second topology diagram as a reference point. An implementation of step 604 may be the same as an implementation of step 502.

605: The network topology generation apparatus displays the second topology diagram.

Step 605 may be replaced with the following. The network topology generation apparatus sends the second topology diagram. For example, the network topology generation apparatus sends the second topology diagram to a terminal device that can display the second topology diagram, such as a personal computer, a notebook computer, a server, or a desktop computer, or may print the second topology diagram by using a printer associated with the network topology generation apparatus.

In this embodiment of this disclosure, the network topology generation apparatus generates the second topology diagram based on the original coordinate information of each fault-related node in the target network. In a process of generating the second topology diagram, the second coordinate of the second node in the second topology diagram is obtained by using the second coordinate of the first node in the second topology diagram as a reference point, the second coordinate of the third node in the second topology diagram is obtained by using the second coordinate of the second node in the second topology diagram as a reference point. A network logical topology diagram of each fault-related node can be efficiently generated, and layout micro-adjustment caused by node overlapping in the second topology diagram can be avoided.

A possible implementation in which the network topology generation apparatus determines the second coordinate of the second node in the second topology diagram based on the first coordinate of the first node, the second coordinate of the first node in the second topology diagram, and the first coordinate of the second node is not described in detail in the foregoing embodiments. With reference to the accompanying drawings, the following describes a possible implementation of determining the second coordinate of the second node in the second topology diagram based on the first coordinate of the first node, the second coordinate of the first node in the second topology diagram, and the first coordinate of the second node.

Figure 7:
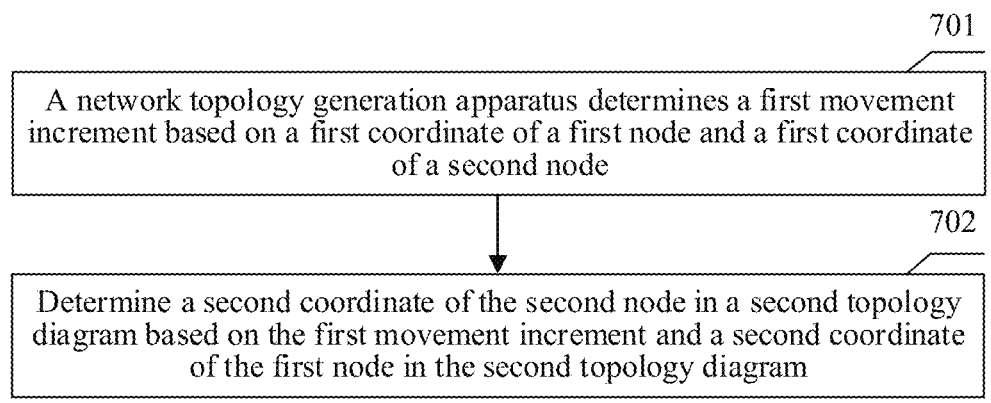
FIG. 7 is a flowchart of a coordinate determining method according to an embodiment of this disclosure.

FIG. 7 is a flowchart of a coordinate determining method according to an embodiment of this disclosure. A network topology generation apparatus may determine a second coordinate of a second node in a second topology diagram by performing a method procedure in FIG. 7. As shown in FIG. 7, the method includes the following steps.

701: The network topology generation apparatus determines a first movement increment based on a first coordinate of a first node and a first coordinate of a second node.

Figure 8:
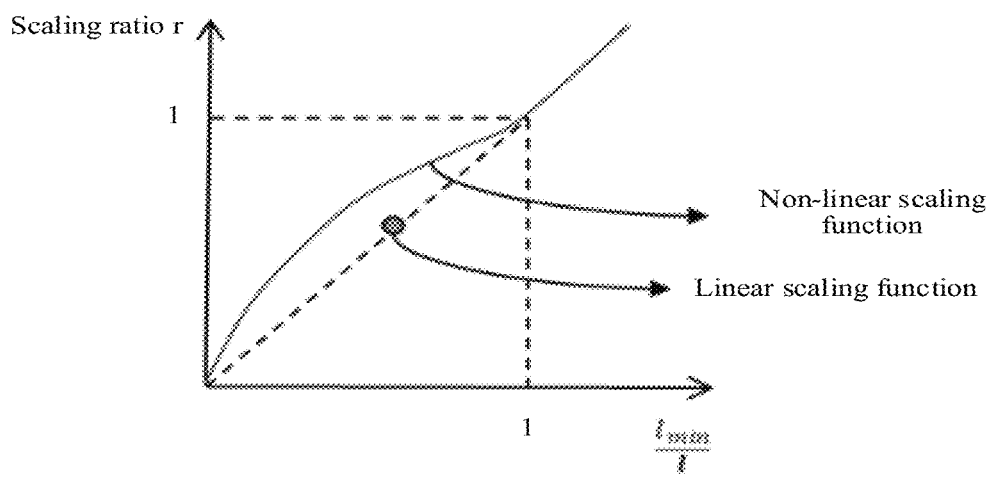
FIG. 8 is an example of a scaling factor function curve graph according to an embodiment of this disclosure.
Figure 9:
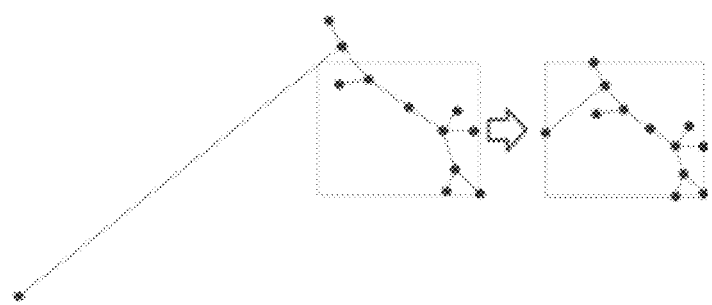
FIG. 9 is a schematic diagram of topology diagram comparison according to an embodiment of this disclosure.

A possible implementation of step 701 is as follows. The network topology generation apparatus obtains a first coordinate difference, and determines the first movement increment based on the first coordinate difference and a non-linear positive correlation factor. The first coordinate difference is a difference between the first coordinate of the second node and the first coordinate of the first node or a difference between the first coordinate of the first node and the first coordinate of the second node. Obtaining a first coordinate difference may be calculating a difference between the first coordinate of the second node and the first coordinate of the first node, or may be calculating a difference between the first coordinate of the first node and the first coordinate of the second node. Determining the first movement increment based on the first coordinate difference and a non-linear positive correlation factor may be using a product of the first coordinate difference and the non-linear positive correlation factor is used as the first movement increment. When a first distance between the first node and the second node in the first topology diagram is greater than a preset spacing, the non-linear positive correlation factor is obtained by using m powers of a ratio of the preset spacing to the first distance, where m is a real number greater than 0 and less than 1. Alternatively, when a first distance is less than or equal to a preset spacing, the non-linear positive correlation factor is obtained by using a ratio of the preset spacing to the first distance. In a possible implementation, the non-linear positive correlation factor meets the following formula:

$$r(l) = \begin{cases} \left(\frac{l_{min}}{l}\right)^m, & l > l_{min} \\ \left(\frac{l_{min}}{l}\right), & l \leq l_{min} \end{cases} \quad (1)$$

r(l) represents the non-linear positive correlation factor, $l_{min}$ represents the preset spacing, l represents the first distance, and m is a constant. m is a constant such as 0.5, 0.6, 0.65, or 0.7 that can be configured based on an actual requirement. The preset spacing can be configured based on the actual requirement. For example, the preset spacing is four times a size of a node. For a node represented by a circle, a size of the node is a diameter of the circle corresponding to the node. For a node represented by a square, a size of the node is a length of the square (or a length of a diagonal) corresponding to the node. FIG. 8 is an example of a scaling factor function curve diagram according to an embodiment of this disclosure. In FIG. 8, a horizontal coordinate is $l_{min}/l$, a vertical coordinate is a scaling proportion (namely, r(l), and a solid line represents a scaling function in formula (1). FIG. 9 is a schematic diagram of topology diagram comparison according to an embodiment of this disclosure. In FIG. 9, a left topology diagram is an example of the first topology diagram, and a right topology diagram is an example of the second topology diagram. By comparing the example of the first topology diagram with the example of the second topology diagram in FIG. 9, it can be learned that a long connection in the first topology diagram is converged to a short connection. It should be understood that the network topology generation apparatus may converge a long connection based on the non-linear positive correlation factor, to ensure a compact layout.

In a possible implementation, a formula for determining, by the network topology generation apparatus, the foregoing first movement increment based on the first coordinate difference and the non-linear positive correlation factor is as follows:

$$d1 = r(n1 - n0) \quad (2),$$

d1 represents the first movement increment, r represents the non-linear positive correlation factor (corresponding to the second node), (n1−n0) represents the first coordinate difference, n1 represents the first coordinate of the second node, and n0 represents the first coordinate of the first node. r in the formula (2) may be calculated by using the formula (1).

In some embodiments, before determining the first movement increment based on the first coordinate difference and the non-linear positive correlation factor, the network topology generation apparatus may calculate the non-linear positive correlation factor by using the formula (1).

Another possible implementation of step 701 is as follows: obtain the first coordinate difference, and determine the first movement increment based on the first coordinate difference and a linear positive correlation factor. The linear positive correlation factor may be a real number configured based on an actual requirement, for example, 0.5 or 0.6. Determining the first movement increment based on the first coordinate difference and a linear positive correlation factor includes the following. The network topology generation apparatus uses a product of the first coordinate and the linear positive correlation factor as the first movement increment.

702: Determine a second coordinate of the second node in a second topology diagram based on the first movement increment and a second coordinate of the first node in the second topology diagram.

A possible implementation of step 702 is as follows. A sum of the first movement increment and the second coordinate of the first node in the second topology diagram is used as the second coordinate of the second node in the second topology diagram.

Figure 10:
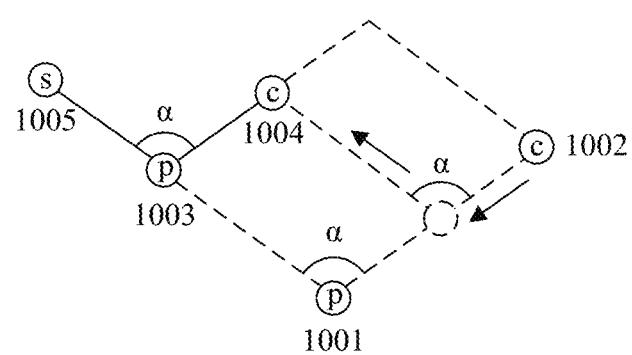
FIG. 10 is a schematic diagram of comparison between an old coordinate and a new coordinate of a node according to an embodiment of this disclosure.
Figure 11:
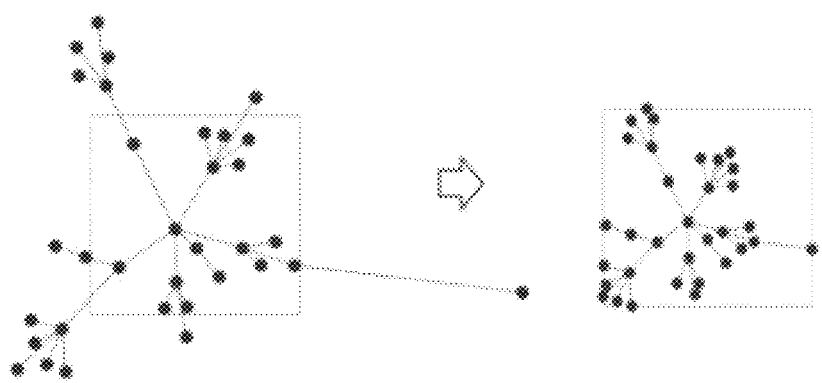
FIG. 11 is another schematic diagram of topology diagram comparison according to an embodiment of this disclosure.

In a possible implementation, a formula for determining the second coordinate of the second node in the second topology diagram based on the first movement increment and the second coordinate of the first node in the second topology diagram is as follows:

$$n1' = n0' + d1, \quad (3)$$

n1' represents the second coordinate of the second node in the second topology diagram, n0' represents the second coordinate of the first node in the second topology diagram, and d1 represents the first movement increment. With reference to the formula (2) and the formula (3), it can be learned that the second coordinate of the second node in the second topology diagram is obtained based on a parallelogram rule. In actual application, a second coordinate of any node in the second topology diagram may be determined based on the parallelogram rule. FIG. 10 is a schematic diagram of comparison between an old coordinate and a new coordinate of a node according to an embodiment of this disclosure. In FIG. 10, 1001 represents the first coordinate (corresponding to an old coordinate) of the first node in the first topology diagram, 1002 represents the first coordinate (corresponding to an old coordinate) of the second node in the first topology diagram, 1003 represents a second coordinate (corresponding to a new coordinate) of the first node in the second topology diagram, 1004 represents a second coordinate (corresponding to a new coordinate) of the second node in the second topology diagram, and 1005 represents a reference node (whose old coordinate and new coordinate are the same). As shown in FIG. 10, an angle between a connection line between 1001 and 1002 and a connection line between 1001 and 1005 is equal to an angle between a connection line between 1003 and 1004 and a connection line between 1003 and 1005. The reference node may be referred to as a reference anchor, a reference anchor node, a start anchor, or the like. It should be understood that, in this embodiment of this disclosure, the network topology generation apparatus derives a child node movement function based on the parallelogram rule, to ensure that a relative angle remains unchanged, and ensure that a structure of each node in the second topology diagram is relatively consistent with a structure of the node in the first topology diagram. FIG. 11 is another schematic diagram of topology diagram comparison according to an embodiment of this disclosure. In FIG. 11, 1101 is an example of the first topology diagram, and 1102 is an example of the second topology diagram. By comparing the example of the first topology diagram with the example of the second topology diagram in FIG. 11, it can be learned that an angle between connection lines in the second topology diagram is equal to an angle between connection lines corresponding to the connection lines in the first topology diagram. In other words, an angle between any two connection lines in the second topology diagram is equal to an angle between two connection lines corresponding to the any two connection lines in the first topology diagram.

In this embodiment of this disclosure, the second coordinate of the second node in the second topology diagram is determined based on the first movement increment and the second coordinate of the first node in the second topology diagram. It can be ensured that a location relationship between the second node and the first node in the second topology diagram is basically unchanged from a location relationship between the second node and the first node in the first topology diagram.

Figure 12:
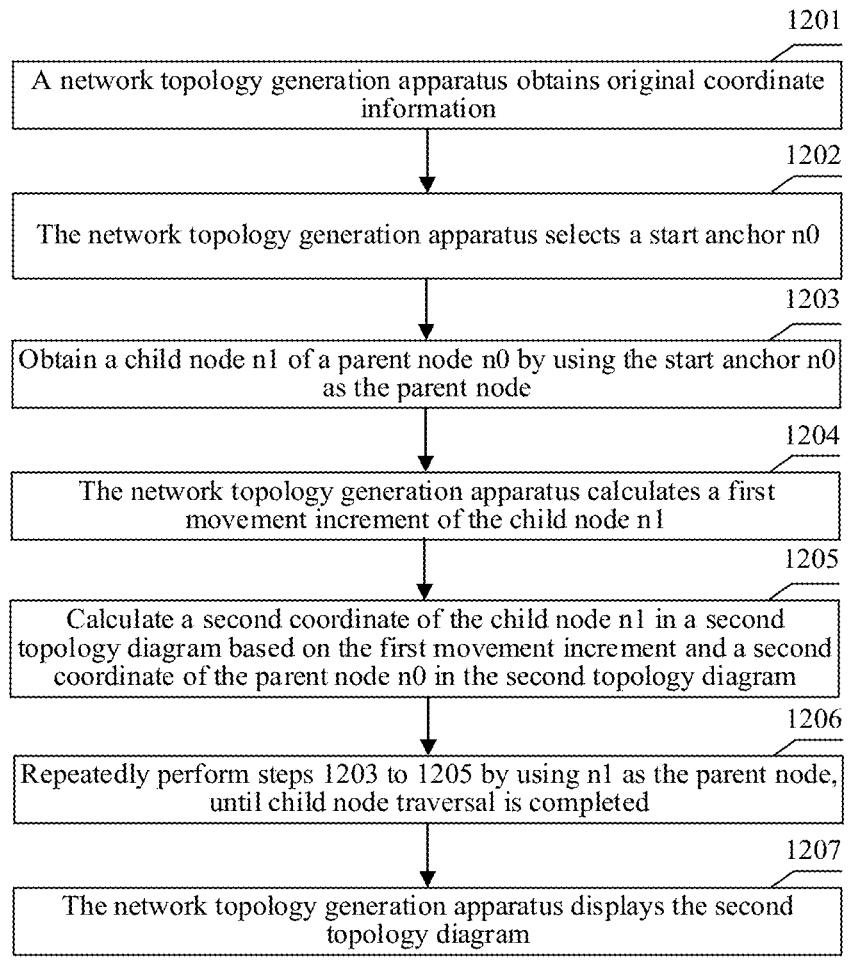
FIG. 12 is a flowchart of another network topology generation method according to an embodiment of this disclosure.

FIG. 12 is a flowchart of another network topology generation method according to an embodiment of this disclosure. A method procedure in FIG. 12 is a possible implementation of the method procedure in FIG. 5. As shown in FIG. 12, the method includes the following steps.

1201: A network topology generation apparatus obtains original coordinate information.

The original coordinate information includes a first coordinate of each topology node in a first topology diagram.

A possible implementation of step 1201 is as follows. An automatic layout module in the network topology generation apparatus obtains, from a topology presentation module (or a topology presentation component), a first coordinate (corresponding to original coordinate information) of each fault-related topology node. In some embodiments, an intelligent fault module may send an ID of each fault-related node (for example, including a topology diagram meta list of an ID of each fault-related node) to the topology presentation module, and the topology presentation module queries, based on the ID of each fault-related node, topology presentation information such as an original coordinate (corresponding to the first coordinate) and an icon corresponding to each node in a topology diagram metadata database. Then, the topology presentation module transfers the original coordinate information (including the original coordinate of each fault-related node) to the automatic layout module.

1202: The network topology generation apparatus selects a start anchor n0.

Figure 13:
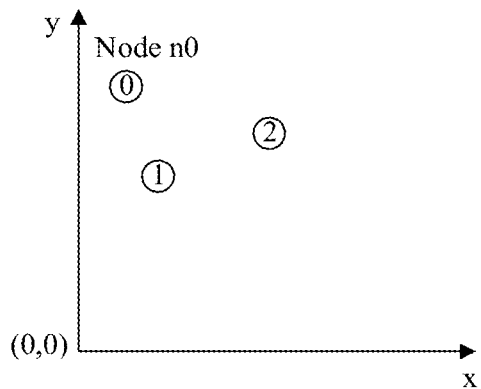
FIG. 13 is a schematic diagram of selecting a start anchor according to an embodiment of this disclosure.

A possible implementation of step 1202 is as follows. The automatic layout module in the network topology generation apparatus randomly selects a node from a plurality of nodes indicated by the original coordinate information as the start anchor. For example, the automatic layout module selects a node (namely, a node having a minimum horizontal coordinate and a maximum vertical coordinate) that is at an upper left corner and that is in the plurality of nodes indicated by the original coordinate information as the start anchor. FIG. 13 is a schematic diagram of selecting the start anchor according to an embodiment of this disclosure. In FIG. 13, each node represents one node indicated by original coordinate information, and a node n0 at an upper left corner in FIG. 13 is used as the start anchor. A location of the start anchor remains unchanged before and after scaling. In other words, n0'=n0, and an increment d0=(0, 0). n0' represents a second coordinate of the start anchor in a second topology diagram, n0 represents a first coordinate of the start anchor in the first topology diagram, and d0 corresponds to a first movement increment. Because selection of the start anchor is not a key point in this embodiment of this disclosure, any node can be used as the start anchor to complete layout.

1203: The network topology generation apparatus uses the start anchor n0 as a parent node, and obtains a child node n1 of the parent node n0.

For example, the network topology generation apparatus searches for and traverses child nodes of the start anchor n0, to obtain the child node n1. In this disclosure, a child node of any node means a node that has a connection relationship with the any node. For another example, the network topology generation apparatus searches for and traverses child nodes of the start anchor n0, to obtain a plurality of child nodes (including the child node n1).

1204: The network topology generation apparatus calculates a first movement increment of the child node n1.

The network topology generation apparatus may calculate the first movement increment based on a non-linear limited distance shrinkage function and based on first coordinates of the parent node n0 and the child node n1 in the first topology diagram respectively. In some embodiments, the network topology generation apparatus may calculate the first movement increment of the child node n1 by using the foregoing formula (2). n1 represents the first coordinate of the parent node n1 in the first topology diagram, n0 represents the first coordinate of the child node n0 in the first topology diagram, and r represents a non-linear positive correlation factor. $d1=r(n1-n0)$ corresponds to the non-linear limited distance shrinkage function.

1205: The network topology generation apparatus calculates a second coordinate of the child node n1 in the second topology diagram based on the first movement increment and a second coordinate of the parent node n0 in the second topology diagram.

Figure 14:
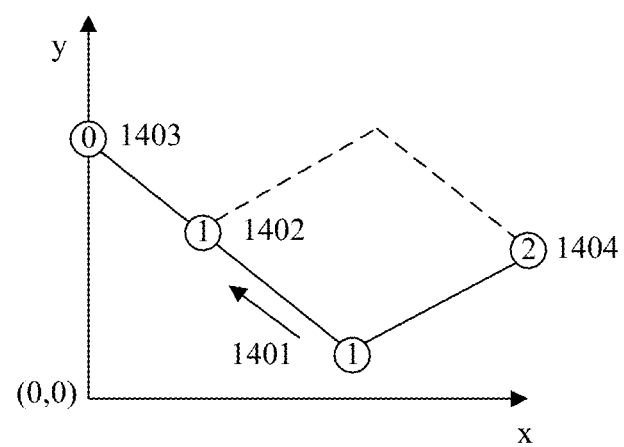
FIG. 14 is an example of a first coordinate of a child node n1 in a first topology diagram and a second coordinate of the child node n1 in a second topology diagram according to an embodiment of this disclosure.

In some embodiments, the network topology generation apparatus may calculate the second coordinate of n1 in the second topology diagram by using the foregoing formula (3). n1' represents a second coordinate of a second node (namely, the child node n1) in the second topology diagram, n0' represents a second coordinate of a first node (namely, the parent node n0) in the second topology diagram, and d1 represents the first movement increment. FIG. 14 is an example of the first coordinate of the child node n1 in the first topology diagram and the second coordinate of the child node n1 in the second topology diagram according to an embodiment of this disclosure. That the network topology generation apparatus calculates the second coordinate of the child node n1 in the second topology diagram based on the first movement increment and the first coordinate of the child node n1 in the first topology diagram may be understood as the following. The network topology generation apparatus moves the child node n1 relative to the start anchor n0. x0_new represents a horizontal coordinate of the second coordinate of the parent node n0 in the second topology diagram, and y0_new represents a vertical coordinate of the second coordinate of the parent node n0 in the second topology diagram. Because the start anchor point does not move, x0_new=x0, y0_new=y0, and the second coordinate of the child node n1 in the second topology diagram is calculated into the following formula:

$$x1\_new = x0 + (x1-x0)*r; \text{ and} \quad (4)$$

$$y1\_new = y0 + (y1-y0)*r; \quad (5)$$

x1_new represents a horizontal coordinate of the second coordinate of the child node n1 in the second topology diagram, and y1_new represents a vertical coordinate of the second coordinate of the child node n1 in the second topology diagram, x0 represents a horizontal coordinate of the first coordinate of the parent node n0 in the first topology diagram, y0 represents a vertical coordinate of the first coordinate of the parent node n0 in the first topology diagram, x1 represents a horizontal coordinate of the first coordinate of the child node n1 in the first topology diagram, y1 represents a vertical coordinate of the first coordinate of the child node n1 in the first topology diagram, and r represents the non-linear positive correlation factor. In FIG. 14, 1401 represents the first coordinate of the child node n1 in the first topology diagram, 1402 represents the second coordinate of the child node n1 in the second topology diagram, 1403 represents the parent node n0, and 1404 represents a node n2 connected to the child node n1.

1206: The network topology generation apparatus repeatedly performs steps 1203 to 1205 by using n1 as the parent node, until child node traversal is completed.

Step 1202 to step 1206 may be understood as a topology diagram generation procedure executed by the automatic layout module in the network topology generation apparatus. The completion of child node traversal means that a new coordinate of each node in the original coordinate information has been re-determined. In other words, a second coordinate of each node in the second topology diagram has been determined. In some embodiments, when the start anchor n0 is used as the parent node, a plurality of child nodes are obtained through search and traversal, a second coordinate of each of the plurality child nodes in the second topology diagram is separately determined in a same manner. Then, steps 1203 to 1205 are repeatedly performed by using each of the plurality of child nodes as a parent node.

1207: The network topology generation apparatus displays the second topology diagram.

A possible implementation of step 1207 is as follows. The automatic layout module returns target coordinate information to a topology presentation module. The topology presentation module displays the second topology diagram based on the target coordinate information. The target coordinate information includes a second coordinate of each topology node in the second topology diagram. The target coordinate information corresponds to the original coordinate information. For example, the original coordinate information includes first coordinates (original coordinates) of a node n0, a node n1, a node n2, . . . , and a node n100 in the first topology diagram. The target coordinate information includes second coordinates (new coordinates) of the node n0, the node n1, the node n2, . . . , and the node n100 in the second topology diagram.

In this embodiment of this disclosure, the child node traversal and a parent-child node iterative layout are used. A new coordinate of a child node moves based on a parallel quadrilateral rule. This ensures stability of a layout structure after shrinkage.

The following describes an example of a network topology generation method with reference to a scenario in a troubleshooting and operations and maintenance phase and functions of modules in a network topology generation apparatus. The scenario in the troubleshooting and operations and maintenance phase occurs after a fault data analysis preparation phase in FIG. 4 is completed. The fault data analysis preparation phase means a phase in which an intelligent fault module determines a phase of a fault in a network based on alarm data.

Figure 15:
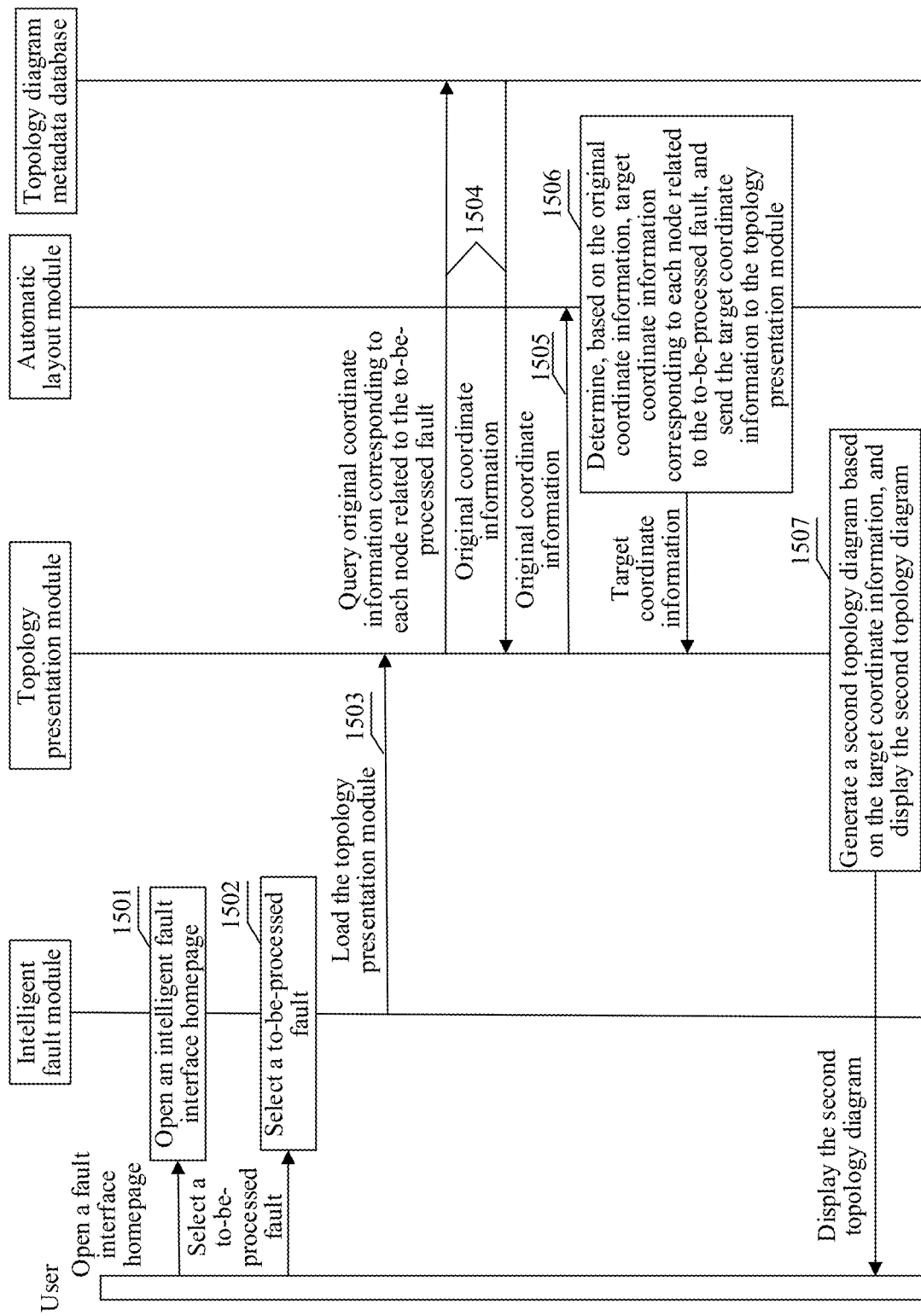
FIG. 15 is a flowchart of another network topology generation method according to an embodiment of this disclosure.

FIG. 15 is a flowchart of another network topology generation method according to an embodiment of this disclosure. A method procedure in FIG. 15 is a possible implementation of the method procedure in FIG. 5. As shown in FIG. 15, the method includes the following steps.

1501: An intelligent fault module opens an intelligent fault interface homepage.

A possible implementation of step 1501 is as follows. In response to an operation of opening the intelligent fault interface homepage by operations and maintenance personnel, the intelligent fault module opens the intelligent fault interface homepage. That an intelligent fault module opens an intelligent fault interface homepage may be as follows. The intelligent fault module displays the intelligent fault interface homepage through a display or a display screen. The intelligent fault interface homepage includes one or more options or interfaces for selecting a to-be-processed fault.

1502: The intelligent fault module selects the to-be-processed fault.

A possible implementation of step 1502 is as follows. In response to an operation of selecting the to-be-processed fault by the operations and maintenance personnel by using the intelligent fault interface homepage, the intelligent fault module selects the to-be-processed fault.

1503: The intelligent fault module loads a topology presentation module.

A possible implementation of step 1502 is as follows. The intelligent fault module transmits an ID of each node related to the to-be-processed fault to the topology presentation module. For example, the intelligent fault module transmits IDs of all nodes (for example, including a topology diagram meta list of the IDs of the fault-related nodes) that are calculated and that are involved in the to-be-processed fault to the topology presentation module.

1504: The topology presentation module queries, in a topology diagram metadata database, original coordinate information corresponding to each node related to the to-be-processed fault.

For example, the topology presentation module queries, based on an ID of each node related to the to-be-processed fault, topology presentation information such as a corresponding original coordinate (namely, a first coordinate) and an icon in the topology diagram metadata database. The original coordinate information may include the ID of each node related to the to-be-processed fault and an original coordinate corresponding to each ID, namely, a first coordinate of the ID in a first topology diagram.

1505: The topology presentation module sends the original coordinate information to an automatic layout module.

1506: The automatic layout module determines, based on the original coordinate information, target coordinate information corresponding to each node related to the to-be-processed fault, and sends the target coordinate information to the topology presentation module.

For an implementation of step 1506, refer to a method procedure in FIG. 12. The target coordinate information may include the ID of each node related to the to-be-processed fault and a second coordinate of each ID in the second topology diagram.

1507: The topology presentation module generates the second topology diagram based on the target coordinate information, and displays the second topology diagram.

In this embodiment of this disclosure, a network topology diagram of each node related to the to-be-processed fault can be efficiently generated, and a layout is compact.

Figure 16:
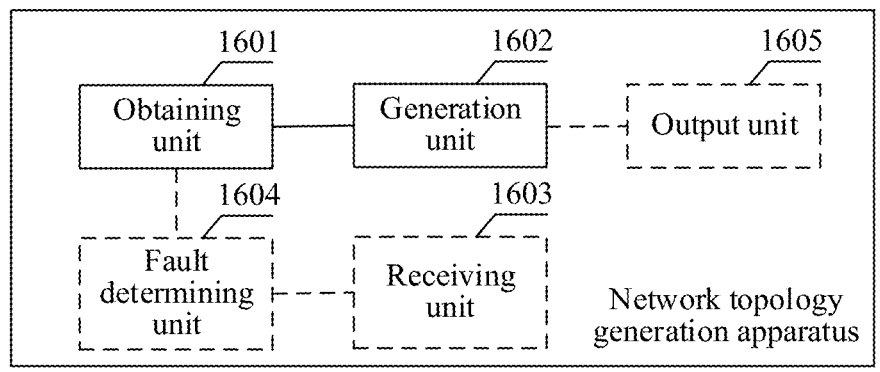
FIG. 16 is a schematic diagram of a structure of a network topology generation apparatus according to an embodiment of this disclosure.

FIG. 16 is a schematic diagram of a structure of a network topology generation apparatus according to an embodiment of this disclosure. As shown in FIG. 16, the network topology generation apparatus includes an obtaining unit 1601 configured to obtain original coordinate information of each topology node in a first topology diagram, where the original coordinate information includes a first coordinate of each topology node in the first topology diagram, and topology nodes in the first topology diagram include a first node, a second node, and a third node, and a generation unit 1602 configured to generate a second topology diagram based on the original coordinate information, where the second topology diagram corresponds to a topology diagram obtained by scaling the first topology diagram, a second coordinate of the second node in the second topology diagram is obtained by using a second coordinate of the first node in the second topology diagram as a reference point, and a second coordinate of the third node in the second topology diagram is obtained by using the second coordinate of the second node in the second topology diagram as a reference point.

The obtaining unit 1601 may correspond to a topology presentation module, and the generation unit 1602 may correspond to an automatic layout module.

In a possible implementation, the generation unit 1602 is further configured to determine the second coordinate of the second node in the second topology diagram based on a first coordinate of the first node, the second coordinate of the first node in the second topology diagram, and a first coordinate of the second node.

In a possible implementation, the generation unit 1602 is further configured to calculate the second coordinate of the second node in the second topology diagram by using the following formula:

$$x2\_new = x1\_new + (x2\_old - x1\_old)*s; \text{ and} \qquad (6)$$

$$y2\_new = y1\_new + (y2\_old - y1\_old)*s, \qquad (7)$$

x2_new represents a horizontal coordinate of the second coordinate of the second node in the second topology diagram, y2_new represents a vertical coordinate of the second coordinate of the second node in the second topology diagram, x1_new represents a horizontal coordinate of the second coordinate of the first node in the second topology diagram, y1_new represents a vertical coordinate of the second coordinate of the first node in the second topology diagram, x2_old represents a horizontal coordinate of the first coordinate of the second node, y2_old represents a vertical coordinate of the first coordinate of the first node, x1_old represents a horizontal coordinate of the first coordinate of the first node, y1_old represents a vertical coordinate of the first coordinate of the first node, and s represents a scaling factor. s is a real number. s may be a preconfigured value. Alternatively, s may be obtained based on a first distance between the first node and the second node in the first topology diagram.

In a possible implementation, the generation unit 1602 is further configured to determine a first movement increment based on the first coordinate of the first node and the first coordinate of the second node, and determine the second coordinate of the second node in the second topology diagram based on the first movement increment and the second coordinate of the first node in the second topology diagram.

In a possible implementation, the generation unit 1602 is further configured to obtain a first coordinate difference, where the first coordinate difference is a difference between the first coordinate of the second node and the first coordinate of the first node or a difference between the first coordinate of the first node and the first coordinate of the second node, and determine the first movement increment based on the first coordinate difference and a non-linear positive correlation factor. When the first distance between the first node and the second node in the first topology diagram is greater than a preset spacing, the non-linear positive correlation factor is obtained by using m powers of a ratio of the preset spacing to the first distance, where m is a real number greater than 0 and less than 1, or when the first distance is less than or equal to a preset spacing, the non-linear positive correlation factor is obtained by using a ratio of the preset spacing to the first distance.

In a possible implementation, the generation unit 1602 is further configured to calculate the non-linear positive correlation factor by using the following formula:

$$r(l) = \begin{cases} \left(\dfrac{l_{min}}{l}\right)^m, & l > l_{min} \\ \left(\dfrac{l_{min}}{l}\right), & l \le l_{min} \end{cases}, \qquad (8)$$

r(l) represents the non-linear positive correlation factor, $l_{min}$ represents the preset spacing, l represents the first distance, and m is a constant. m is a constant such as 0.5, 0.6, 0.65, or 0.7 that can be configured based on an actual requirement. The preset spacing can be configured based on the actual requirement. For example, the preset spacing is four times a size of a node. For a node represented by a circle, a size of the node is a diameter of the circle corresponding to the node. For a node represented by a square, a size of the node is a length of the square (or a length of a diagonal) corresponding to the node.

In a possible implementation, the network topology generation apparatus further includes a receiving unit 1603 configured to receive alarm information uploaded by a node in a target network, where a plurality of nodes in the target network correspond to topology nodes in the first topology diagram, and a fault determining unit 1604 configured to determine a plurality of fault-related nodes in the target network based on the alarm information and topology diagram metadata, where the topology diagram metadata is for determining a topology relationship between nodes in the target network. The obtaining unit 1601 is further configured to obtain topology node information and original coordinate information corresponding to the plurality of nodes.

The receiving unit 1603 may correspond to an alarm collection module, and the fault determining unit 1604 may correspond to an intelligent fault module.

In a possible implementation, the network topology generation apparatus further includes an output unit 1605 configured to display the second topology diagram or send the second topology diagram. The output unit 1605 may correspond to the topology presentation module.

In some embodiments, the obtaining unit 1601 may be configured to perform one or more of step 501, step 603, and step 1201. In some embodiments, the generation unit 1602 may be configured to perform one or more of step 502, step 604, step 701, step 1201 to step 1206, and step 702. In some embodiments, the receiving unit 1603 may be configured to perform step 601. In some embodiments, the fault determining unit 1604 may be configured to perform step 602. In some embodiments, the output unit 1605 may be configured to perform step 605 and/or step 1207.

Figure 17:
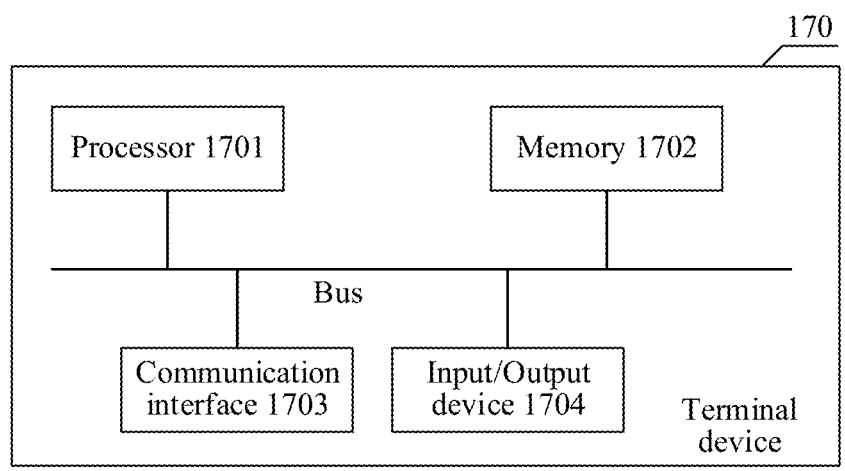
FIG. 17 is a schematic diagram of a structure of a terminal device according to an embodiment of this disclosure.

FIG. 17 is a schematic diagram of a structure of a terminal device according to an embodiment of this disclosure. As shown in FIG. 17, a terminal device 170 includes a processor 1701, a memory 1702, a communication interface 1703, and an input/output device 1704. The processor 1701, the memory 1702, and the communication interface 1703 are connected to each other by using a bus. The terminal device in FIG. 17 may be a network topology generation apparatus in the foregoing embodiments.

The memory 1702 includes, but is not limited to, a random-access memory (RAM), a read-only memory (ROM), an erasable programmable ROM (EPROM), or a compact disc (CD) ROM (CD-ROM). The memory 1702 is configured to store related instructions and data. The communication interface 1703 is configured to receive and send data. The input/output device 1704 may include an input device such as a keyboard, a mouse, and a touchscreen, and an output device such as a display or a screen.

The processor 1701 may be one or more central processing units (CPU). When the processor 1701 is one CPU, the CPU may be a single-core CPU, or may be a multi-core CPU. The steps performed by the network topology generation apparatus in the foregoing embodiments may be based on the structure of the terminal device shown in FIG. 17. Further, the input/output device 1704 may implement a function of the output unit 1605. The processor 1701 may implement functions of the obtaining unit 1601, the generation unit 1602, and the fault determining unit 1604. The communication interface 1703 may implement a function of the receiving unit 1603. In other words, the input/output device 1704 may implement a function of the topology presentation module in FIG. 4. The processor 1701 may implement a function of the automatic layout module and a function of the intelligent fault module in FIG. 4. The communication interface 1703 may implement a function of the alarm collection module in FIG. 4.

An embodiment of this disclosure provides a computer-readable storage medium. The computer-readable storage medium stores a computer program. When the computer program is executed by a processor, the network topology generation method provided in the foregoing embodiments is implemented.

An embodiment of this disclosure provides a computer program product including instructions. When the computer program product runs on a computer, the computer is enabled to perform the network topology generation method provided in the foregoing embodiments.

In the foregoing embodiments, all or some of the functions may be implemented by using software, hardware, or a combination of software and hardware. When software is used to implement embodiments, all or some of embodiments may be implemented in a form of a computer program product. The computer program product includes one or more computer instructions. When the computer program instructions are loaded and executed on the computer, the procedures or functions according to embodiments of this disclosure are all or partially generated. The computer may be a general-purpose computer, a special-purpose computer, a computer network, or another programmable apparatus. The foregoing computer instructions may be stored in the computer-readable storage medium. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a DIGITAL VERSATILE DISC (DVD)), a semiconductor medium (for example, a solid-state drive (SSD)).

A person of ordinary skill in the art may understand that all or some of the processes of the methods in embodiments may be implemented by a computer program instructing relevant hardware. The program may be stored in a computer-readable storage medium. When the program runs, the processes of the methods in embodiments are performed. The foregoing storage medium includes any medium that can store program code, such as a ROM or a RAM, a magnetic disk or an optical disc.

What is claimed is:

1. A method comprising:
   receiving, from a fourth node in a target network, alarm information, wherein the target network comprises a first node, a second node, and a third node;
   determining, based on the alarm information and topology diagram metadata, a plurality of fault-related nodes in the target network, wherein the topology diagram metadata is for determining a topology relationship between nodes in the target network;
   obtaining original coordinate information of topology nodes in a first topology diagram, wherein the original coordinate information comprises a first coordinate of each topology node in the first topology diagram, and wherein the topology nodes comprise the first node, the second node, and the third node;
   scaling the first topology diagram to obtain a third topology diagram; and
   generating, based on the original coordinate information, a second topology diagram corresponding to the third topology diagram, wherein a second coordinate of the second node in the second topology diagram is based on a second coordinate of the first node that is in the second topology diagram and that is a first reference point, and wherein a second coordinate of the third node in the second topology diagram is based on the second coordinate of the second node that is in the second topology diagram and that is a second reference point;

wherein obtaining the original coordinate information comprises obtaining second original coordinate information corresponding to the fault-related nodes in the first topology diagram.

2. The method of claim 1, wherein the original coordinate information further indicates a first connection relationship between the first node and the second node and a second connection relationship between the second node and the third node.

3. The method of claim 2, wherein the first node and the second node in the first topology diagram are in a first connection line, wherein the second node and the third node in the first topology diagram are in a second connection line, wherein the first node and the second node in the second topology diagram are in a third connection line, wherein the second node and the third node in the second topology diagram are in a fourth connection line, and wherein a first angle between the first connection line and the second connection line in the first topology diagram is equal to a second angle between the third connection line and the fourth connection line in the second topology diagram.

4. The method of claim 3, wherein a first ratio of a third length of the third connection line to a first length of the first connection line is not equal to a second ratio of a fourth length of the fourth connection line to a second length of the second connection line.

5. The method of claim 1, wherein a distance between any two nodes in the second topology diagram is greater than or equal to a preset distance.

6. The method of claim 1, further comprising obtaining the second coordinate of the second node in the second topology diagram using the first coordinate of the first node, the second coordinate of the first node in the second topology diagram, and the first coordinate of the second node.

7. The method of claim 6, further comprising:
obtaining a first movement increment using the first coordinate of the first node and the first coordinate of the second node; and
obtaining, using the first movement increment and the second coordinate of the first node in the second topology diagram, the second coordinate of the second node in the second topology diagram.

8. The method of claim 7, wherein the first movement increment is positively correlated with a first coordinate difference, and wherein the first coordinate difference is between the first coordinate of the second node and the first coordinate of the first node or between the first coordinate of the first node and the first coordinate of the second node.

9. The method of claim 8, further comprising:
identifying that a first distance between the first node and the second node in the first topology diagram is greater than a preset spacing;
obtaining, in response to identifying that the first distance is greater than the preset spacing and using m powers of a ratio of the preset spacing to the first distance, a non-linear positive correlation factor, wherein m is a real number greater than 0 and less than 1; and
further obtaining, using the first coordinate difference and the non-linear positive correlation factor, the first movement increment.

10. The method of claim 8, further comprising:
identifying that a first distance between the first node and the second node in the first topology diagram is less than or equal to a preset spacing;
obtaining, in response to identifying that the first distance is less than or equal to the preset spacing and using a ratio of the preset spacing to the first distance, a non-linear positive correlation factor; and
further obtaining, using the first coordinate difference and the non-linear positive correlation factor, the first movement increment.

11. The method of claim 1, wherein after generating the second topology diagram, the method further comprises displaying the second topology diagram.

12. The method of claim 1, wherein after generating the second topology diagram, the method further comprises sending the second topology diagram.

13. A network topology generation apparatus comprising:
a memory configured to store instructions; and
one or more processors coupled to the memory and configured to execute the instructions to cause the network topology generation apparatus to:
receive, from a fourth node in a target network, alarm information, wherein the target network comprises a first node, a second node, and a third node;
determine, based on the alarm information and topology diagram metadata, a plurality of fault-related nodes in the target network, wherein the topology diagram metadata is for determining a topology relationship between nodes in the target network;
obtain original coordinate information of topology nodes in a first topology diagram, wherein the original coordinate information comprises a first coordinate of each topology node in the first topology diagram, and wherein the topology nodes comprise the first node, the second node, and the third node;
scale the first topology diagram to obtain a third topology diagram; and
generate, based on the original coordinate information, a second topology diagram corresponding to the third topology diagram, wherein a second coordinate of the second node in the second topology diagram is based on a second coordinate of the first node that is in the second topology diagram and that is a first reference point, and wherein a second coordinate of the third node in the second topology diagram is based on the second coordinate of the second node that is in the second topology diagram and that is a second reference point;
wherein obtaining the original coordinate information comprises obtaining second original coordinate information corresponding to the fault-related nodes in the first topology diagram.

14. The network topology generation apparatus of claim 13, wherein the original coordinate information further indicates a first connection relationship between the first node and the second node and a second connection relationship between the second node and the third node.

15. The network topology generation apparatus of claim 14, wherein the first node and the second node in the first topology diagram are in a first connection line, wherein the second node and the third node in the first topology diagram are in a second connection line, wherein the first node and the second node in the second topology diagram are in a third connection line, wherein the second node and the third node in the second topology diagram are in a fourth connection line, and wherein a first angle between the first connection line and the second connection line in the first topology diagram is equal to a second angle between the third connection line and the fourth connection line in the second topology diagram.

16. The network topology generation apparatus of claim 15, wherein a first ratio of a third length of the third connection line to a first length of the first connection line is not equal to a second ratio of a fourth length of the fourth connection line to a second length of the second connection line.

17. The network topology generation apparatus of claim 13, wherein a distance between any two nodes in the second topology diagram is greater than or equal to a preset distance.

18. The network topology generation apparatus of claim 13, wherein the one or more processors further configured to execute the instructions to cause the network topology generation apparatus to obtain, using the first coordinate of the first node, the second coordinate of the first node in the second topology diagram, and the first coordinate of the second node, the second coordinate of the second node in the second topology diagram.

19. A computer program product comprising computer-executable instructions that are stored on a non-transitory computer-readable medium and that, when executed by one or more processors, cause a network topology generation apparatus to:
  receive, from a fourth node in a target network, alarm information, wherein the target network comprises a first node, a second node, and a third node;
  determine, based on the alarm information and topology diagram metadata, a plurality of fault-related nodes in the target network, wherein the topology diagram metadata is for determining a topology relationship between nodes in the target network;
  obtain original coordinate information of topology nodes in a first topology diagram, wherein the original coordinate information comprises a first coordinate of each topology node in the first topology diagram, and wherein the topology nodes comprise a first node, a second node, and a third node;
  scale the first topology diagram to obtain a third topology diagram; and
  generate, based on the original coordinate information, a second topology diagram corresponding to the third topology diagram, wherein a second coordinate of the second node in the second topology diagram is based on a second coordinate of the first node that is in the second topology diagram and that is a first reference point, and wherein a second coordinate of the third node in the second topology diagram is based on the second coordinate of the second node that is in the second topology diagram and that is a second reference point;
  wherein obtaining the original coordinate information comprises obtaining second original coordinate information corresponding to the fault-related nodes in the first topology diagram.

* * * * *